United States Patent [19]

Akahori et al.

[11] Patent Number: 5,718,855
[45] Date of Patent: Feb. 17, 1998

[54] METHOD OF MOLDING AROMATIC POLYIMIDE RESIN

[75] Inventors: Kiyokazu Akahori; Kazunari Iwamoto, both of Settsu, Japan

[73] Assignee: Kaneka Corporation, Osaka, Japan

[21] Appl. No.: 817,927

[22] PCT Filed: Nov. 6, 1995

[86] PCT No.: PCT/JP95/02266

§ 371 Date: May 9, 1996

§ 102(e) Date: May 9, 1996

[87] PCT Pub. No.: WO96/14977

PCT Pub. Date: May 23, 1996

[30] Foreign Application Priority Data

Nov. 9, 1994 [JP] Japan ................... 6/274815

[51] Int. Cl.⁶ ................................................. B29C 43/02
[52] U.S. Cl. ........................ 264/122; 264/126; 264/127
[58] Field of Search ............................. 264/122, 126, 264/127

[56] References Cited

U.S. PATENT DOCUMENTS

| | | | |
|---|---|---|---|
| 4,302,413 | 11/1981 | Howe et al. | 264/126 |
| 4,948,869 | 8/1990 | Ogoe et al. | 264/126 |
| 5,069,848 | 12/1991 | Saruwatari et al. | 264/126 |
| 5,316,711 | 5/1994 | Thorne | 264/126 |

FOREIGN PATENT DOCUMENTS

| | | |
|---|---|---|
| 4-201434 | 7/1992 | Japan . |
| 4-201435 | 7/1992 | Japan . |
| 6-887 | 1/1994 | Japan . |

*Primary Examiner*—Mary Lynn Theisen
*Attorney, Agent, or Firm*—Armstrong, Westerman, Hattori, McLeland & Naughton

[57] ABSTRACT

A method of molding an aromatic polyimide resin, comprising compression molding an aromatic polyimide resin composition powder comprising an aromatic polyimide resin and a fluorine resin added thereto, and then sintering the compression molded product in a mixed gas atmosphere of oxygen and inert gas, having the oxygen concentration of 0.1 to 10% at 360° to 480° C., or sintering the compression molded product in an inert gas atmosphere and then heat treating the same in a mixed gas atmosphere of oxygen and inert gas at 360° to 480° C. This method can solve the problems on color shade and strength due to sintering in the case of molding an aromatic polyimide resin having a fluorine resin added thereto, and can provide a polyimide molding having excellent quality.

5 Claims, No Drawings

METHOD OF MOLDING AROMATIC POLYIMIDE RESIN

TECHNICAL FIELD

The present invention relates to a method of molding an aromatic polyimide resin having excellent quality.

TECHNICAL BACKGROUND

Moldings of an aromatic polyimide resin have excellent varous properties such as friction resistance, chemical resistance, radiation resistance and the like in addition to excellent heat resistance, and are widely used as mechanism parts such as sliding member, or used in the fields of automobiles, office instruments, electric and electronic parts, aerospace, atomic energy, general industrial machines, and the like.

In general, moldings of aromatic polyimide resin are molded by forming a powder impact (green product) by compression molding, and then sintering the same in an inert atmosphere such as nitrogen in a non-pressure state. Thus the method of producing a molding of a non-fusible polyimide resin is the same molding method as in ceramics and powder metallurgy, and it is known that when molding, a fluorine resin is added for the purpose of improving molding workability, such as reducing friction resistance at molding or relaxing internal stress of the molding. Further, the thus-obtained molding of polyimide resin having a fluorine resin added thereto is, as a result of effects at molding as mentioned above, a homogeneous product having a small density distribution, and an excellent molding which does not cause lamination on appearance can be obtained. It is also known that a fluorine resin is added for the purpose of improving sliding properties of the molding of polyimide resin, However, if the molding of such a polyimide resin containing a fluorine resin is sintered in an inert atmosphere, there is the problem on the quality. Specifically, if the molding of a polyimide resin having a fluorine resin or the like added thereto is sintered at high temperature, there are the problems that hue on appearance of the molding changes, thereby causing color shade, and the like. On the other hand, if the sintering temperature is lowered, there is no problem on color shade and the like, but the problem arises that strength of the molding is not sufficient.

Accordingly, the object of the present invention is to solve the problem in the sintering step in the case of molding an aromatic polyimide resin by adding a fluorine resin thereto, and is to provide a molding method which can obtain an aromatic polyimide resin molding having excellent quality.

DISCLOSURE OF THE INVENTION

As a result of extensive investigations in view of the above problems, the present inventors have reached to complete the present invention. That is, the present invention relates to a method of molding an aromatic polyimide resin, characterized in that in the step of compression molding a powder of an aromatic polyimide resin composition comprising an aromatic polyimide resin and a fluorine resin added thereto, followed by sintering, the resulting molding is sintered in a mixed gas atmosphere of oxygen and inert gas, or sintered in an inert gas atmosphere, and then heat treated in a mixed gas atmosphere of oxygen and inert gas.

It is preferred that the mixed gas of oxygen and inert gas has the oxygen gas concentration of 0.1 to 20%. Further, it is preferred that the above-mentioned sintering temperature and heat treatment temperature are in the range of 360° to 480° C.

A method of producing an aromatic polyimide resin powder used in the present invention is not particularly limited, and for example, the following methods can be employed: a method of obtaining an aromatic polyimide powder by heating a polyamic acid solution in the presence of a tertiary amine, as described in Japanese Patent Publication Sho 39-30060 or Japanese Laid-Open Patent Application Hei 4-142332; a method of producing a polyimide powder, characterized in that a uniform solution having a low rotational viscosity prepared by dissolving almost equimolar amounts of a biphenyltetracarboxylic acid component and an aromatic diamine component in an amide type solvent in which a polyimide produced does not dissolve in an amount of 1% by weight or more, at a temperature lower than 155° C. is heated to a temperature of 160° to 300° C. for a short period of time while stirring, the temperature is maintained within the above-mentioned range to produce an aromatic polyimide having a logarithmic viscosity of 0.2 to 1 (measured at 50° C. and 0.5 g/100 ml in p-chloroform) and the polyimide is precipitated as fine particles, wherein an aromatic tetracarboxylic dianhydride and an aromatic diamine are reacted in an organic polar solvent to obtain a polyamic acid solution, and the solution is heated to obtain a polyimide resin powder, as described in Japanese Laid-Open Patent Application Sho 57-200452; a method of producing fine particles comprising at least one of polyamic acid, characterized in that at least one diamine and at least one tetracarboxylic dianhydride are reacted in an organic solvent which becomes a solvent to the diamine and at least one of the dianhydrides to prepare a solution of a polymer composition containing a polyamic acid, and the the solution is mixed with a precipitant to the polyamic acid, selected from the group consisting of a liquid hydrocarbon, an aliphatic ether, an alicyclic ether and benzonitrile to precipitate polyamic acid solid particles which are finely divided and are individually isolated, as described in Japanese Patent Publication Sho 39-9078; a method of producing nitrogen-containing heat-resistant polymer particles in a precipitation method of the nitrogen-containing heat-resistant polymer particles characterized by continuously casting a precipitant which is miscible with the nitrogen-containing heat resistant polymer solution and is a on-solvent of the polymer into 1000 to 5000 rpm high speed rotary impact type pulverizer and simultaneously feeding the nitrogen-containing heat resistant polymer solution having a concentration of 5 to 50% by weight at a flow rate of 0.01 to 2 times the above-mentioned precipitant, wherein an aromatic tetracarboxylic dianhydride and an aromatic diamine are reacted in an organic polar solvent to obtain a polyamic acid solution, this solution is contacted with a poor catalyst to the polyamic acid, such as toluene or hexane, to obtain polyamic acid as a powder, and the powder is heated to obtain a polyimide resin powder, as described in Japanese Laid-Open Patent Application Sho 61-252228; and a method of producing a polyimide powder, characterized by the first step of heat polymerizing at least one aromatic tetracarboxylic dianhydride capable of producing a polyimide which is infusible to heat and is insoluble in an organic solvent and almost same amount of aromatic polyisocyanate in an organic solvent comprising as a main component at least one polar solvent selected from an amide type polar solvent and a phenol type polar solvent at a temperature of 100° to 200° C. to precipitate particles of the polyimide in a slurry state, the second step of obtaining the polyimide particles from the slurry formed in the first step by filtration or centrifugation, and the third step of washing the polyimide particles obtained in the second step with an organic solvent comprising as a main component the same polar solvent as mentioned above, thereby obtaining a spherical porous polyimide powder having an average particle diameter of 1 to 20 μm, wherein an aromatic tetracarboxylic acid component and an aromatic diisocyanate are reacted in an organic polar solvent to directly obtain a polyimide resin powder. The aromatic tetracarboxylic dianhydride and the aromatic tetracarboxylic acid component used here are not particularly limited. Further, a method of directly obtaining a polyimide resin powder by reacting an aromatic diamine and an aromatic diisocyanate in an organic polar solvent can also be used. The aromatic tetracarboxylic dianhydride and the aromatic tetracarboxylic acid component used here are not particularly limited. In addition, the aromatic diamine and the aromatic diisocyanate are not particularly limited. More preferably, an aromatic polyimide resin represented by a polyimide obtained using pyromellitic dianhydride or the derivative thereof and 4,4-diaminodiphenyl ether or the derivative thereof as main raw materials is used.

Examples of the fluorine resin which is added to the aromatic polyimide resin powder used in the present invention include polytetrafluoroethylene, tetrafluoroethylene/hexafluoroethylene copolymer, tetrafluoroethylene/perfluoroalkylvinyl ether copolymer, polychlorotrifluoroethylene, polyvinylidene fluoride, polyvinyl fluoride, ethylene/tetrafluoroethylene copolymer, ethylene/chlorotrifluorooethylene copolymer, polyfluoroalkylacryl polymer, poly-fluoroalkylvinyl polymer, polyfluoroalkoxy polymer, and the like. The molecular weight of those fluorine resins is not particularly limited, and, for example, from a low molecular weight fluorine resin having a molecular weight of about 400 to a high molecular weight fluorine resin having a molecular weight of about 10,000,000 can be used. The amount of fluorine resin added to the aromatic polyimide resin in the present invention is preferably 0.01 to 5% by weight, and more preferably 0.01 to 2% by weight. The fluorine resin is added for the purpose of mainly improving molding workability. If the amount of the fluorine resin added to the aromatic polyimide resin is less than 0.01% by weight, the improvement effect of the moldability becomes insufficient and this is not preferable. On the other hand, if the amount exceeds 5% by weight, mechanical characteristics and impact characteristics of the molding vary and this is not preferable. A method of adding this fluorine resin to the aromatic polyimide resin powder is not particularly limited, and includes a method of directly mixing using homogenizer, Henschel mixer or the like, and a method of mixing by dispersing one or both of the polyimide resin and the fluorine resin in an appropriate solvent. Further, the fluorine resin may be added in polymerizing the polyimide resin. Also, the fluorine resin can externally be added such that a mold coated with the fluorine resin is used.

In addition to the above-mentioned fluorine resin, fillers can be formulated, if necessary, with the aromatic polyimide resin powder of the present invention to improve various properties of the molding, such as mechanical property, sliding property, electric property, chemical resistance, and the like. Examples of the filler include graphite, molybdenum disulfide, boron nitride, polytetra-fluoroethylene, glass fiber, carbon fiber, aramid fiber, potassium titanate fiber, aluminum, lead, and various kinds of metal oxides.

The aromatic polyimide resin composition obtained above is filled in a mold at, for example, room temperature, and compression molded under a pressure of 1000 to 10000 kg/cm² to obtain a green product, and the green product is sintered in a mixed gas atmosphere of oxygen and inert gas, or the green product is sintered in an inert gas atmosphere and then heat treated in a mixed gas atmosphere of oxygen and inert gas.

The sintering temperature in the mixed gas atmosphere of oxygen and inert gas is 360° to 480° C., preferably 380° to 480° C., and more preferably 400° to 460° C. The heat treatment temperature in the mixed gas atmosphere of oxygen and inert gas is 360° to 480° C., preferably 380° to 480° C., and more preferably 380° to 450° C. If the sintering temperature or heat treatment temperature is lower than this temperature, the molding does not develop sufficient properties such as strength, and if the sintering or heat treatment is conducted at a temperature higher than 480° C., the polyimide itself thermally deteriorates, which is undesirable.

In other words, if the sintering is conducted at a temperature higher than 380° C. in an inert atmosphere as in the conventional method, the properties of the polyimide molding improve, but, on the other hand, change in hue on appearance and color shade become remarkable. Further, if the sintering is conducted at a temperature lower than 380° C., change in hue on appearance and color shade which become problem are difficult to occur, but it is difficult to develop properties such as sufficient strength in using the polyimide molding, or very long sintering time is required to develop sufficient strength, which is not preferable from the point of productivity On the other hand, the present invention can obtain a polyimide molding having sufficient strength without causing color shade by sintering or heat treating in the mixed gas atmosphere of oxygen and inert gas as mentioned above.

In the method of molding the polyimide resin according to the present invention, the sintering time and heat treatment time are not particularly limited, and the amount of oxygen used in the sintering step or the heat treatment step is not also particularly limited. However, where the oxygen concentration is high, if the sintering or heat treatment is conducted at high temperature, there is the possibility that the polyimide deteriorates. For this reason, the effect can sufficiently be developed when the oxygen concentration is preferably 0.1 to 20%, more preferably 0.1 to 10%, and most preferably 0.1 to 5%.

The above-mentioned temperature, time and oxygen concentration at sintering or heat treatment can individually exhibit the effects of the present invention without great restriction, but the combination of those conditions is important. In the molding of polyimide resin, the properties are improved as the sintering temperature becomes high, and on the other hand, change in hue or color shade is liable to occur. Further, the sintering or heat treatment in high oxygen concentration at high temperature invites deterioration of the properties of the molding due to the deterioration of the polyimide itself. In more detail, if the molding is subjected to the sintering or heat treatment at 460° C. or for 10 hours or more at the oxygen concentration of 20% or more, remarkable deterioration of the properties such as strength occurs, which is not preferable. In order to solve both properties and problem on appearance of the polyimide resin molding, it is necessary to reduce the oxygen concentration when the sintering or heat treatment is applied at high temperature. It is desirable that the sintering temperature is about 400° to 460° C., the heat treatment temperature is about 380° to 450° C., and the oxygen concentration is about 0.1 to 5%. Further, it is preferred that the sintering and/or heat treatment temperatures are within 50 hours, preferably within 20 hours, and more preferably within 10 hours, from the point of preventing deterioration of the polyimide.

The oxygen source at sintering or heat treatment is not particularly limited, and any method can be employed so long as it is possible to make present oxygen in the atmosphere during the sintering step, such as mixing with an inert gas such as nitrogen, air itself, mixing an inert gas and air, or mixing air and oxygen. Further, a method of mixing a gas is not particularly limited, and any method can be employed if it is possible to make present oxygen in the atmosphere of the sintering furnace, such as a method of preparing a gas in which oxygen is previously present, or its liquified gas, and introducing the same into the sintering furnace, or a method of separately feeding each of at least two kinds of gases or mixed gases in the sintering furnace, and mixing those in the sintering furnace.

The treatment method in the mixed gas atmosphere of oxygen and inert gas is not particularly limited. Specifically, the effect of the present invention is exhibited if the heat treatment is finally conducted in the mixed gas atmosphere of oxygen and inert gas when sintering the green product obtained by compressing molding under a non-pressure state, such as a method of conducting the sintering in the mixed gas atmosphere of oxygen and inert gas, a method of sintering the green product in the inert gas atmosphere such as nitrogen in the absence of oxygen, and then continuously heat treating the same while supplying oxygen without cooling, a two step method of sintering the green product in the inert gas atmosphere such as nitrogen in the absence of oxygen, cooling the same, and then heat treating the same in the mixed gas atmosphere of oxygen and inert gas, or the combination of those methods.

BEST MODE FOR PRACTICING THE INVENTION

The present invention is specifically explained by the following examples, but the present invention is not limited to those examples.

The aromatic polyimide resin used in the examples was synthesized from pyromellitic dianhydride and 4,4'-diaminodiphenyl ether according to the method described in Japanese Laid-Open Patent Application 4-142332, and the polyimide resin powder obtained and polytetrafluoroethylene powder were mixed at a weight ratio of 100:1 using a Henschel mixer to obtain a powder of the polyimide resin composition.

EXAMPLE 1

The polyimide resin composition powder obtained above was filled in a mold having an opening size of 60×10 mm and compression molded at room temperature under a pressure of 5000 kg/cm$^2$ to obtain a green product (compression molded product) of 60×10×3 mm. This compression molded product was sintered in an atmosphere of nitrogen/oxygen concentration ratio=95/5 at 400° C. for 5 hours. It was confirmed that the product thus treated was a homogeneous product having no color shade on appearance.

EXAMPLE 2

The polyimide resin composition powder obtained above was filled in a mold having an opening size of 60×10 mm and compression molded at room temperature under a pressure of 5000 kg/cm$^2$ to obtain a green product (compression molded product) of 60×10×3 mm. This compression molded product was sintered in an atmosphere of nitrogen/oxygen concentration ratio of 99/1 at 420° C. for 10 hours. It was confirmed that the product thus treated was a homogeneous product having no color shade on appearance.

EXAMPLE 3

The polyimide resin composition powder obtained above was filled in a mold having an opening size of 60×10 mm and compression molded at room temperature under a pressure of 5000 kg/cm$^2$ to obtain a green product (compression molded product) of 60×10×3 mm. This compression molded product was sintered in a nitrogen atmosphere at 400° C. for 10 hours, and then heat treated at 380° C. for 5 hours while supplying air in place of nitrogen. It was confirmed that this product was a homogeneous product having no color shade on appearance.

EXAMPLE 4

The polyimide resin composition powder obtained above was filled in a mold having an opening size of 60×10 mm and compression molded at room temperature under a pressure of 5000 kg/cm$^2$ to obtain a green product (compression molded product) of 60×10×3mm. This compression molded product was sintered in a nitrogen atmosphere at 400° C. for 10 hours, cooled, and taken out. As a result, occurrence of color shade on appearance was observed. This product was then heat treated in air at 380° C. for 10 hours. As a result, it was confirmed that color shade disappeared and the product was a homogeneous product on appearance.

EXAMPLE 5

The polyimide resin composition powder obtained above was filled in a mold having an opening size of 60×10 mm and compression molded at room temperature under a pressure of 5000 kg/cm$^2$ to obtain a green product (compression molded product) of 60×10×3mm. This compression molded product was sintered in a nitrogen atmosphere at 400° C. for 10 hours, cooled, and taken out. As a result, occurrence of color shade on appearance was observed. This product was then heat treated in an atmosphere of nitrogen/oxygen concentration ratio=98/2 at 400° C. for 5 hours. As a result, it was confirmed that color shade disappeared and the product was a homogeneous product on appearance.

EXAMPLE 6

The polyimide resin composition powder obtained above was filled in a mold having an opening size of 60×10 mm and compression molded at room temperature under a pressure of 5000 kg/cm$^2$ to obtain a green product (compression molded product) of 60×10×3 mm. This compression molded product was sintered in an atmosphere of nitrogen/oxygen concentration ratio=99/1 at 450° C. for 2 hours. It was confirmed that this product did not have color shade and was a homogeneous product on appearance.

EXAMPLE 7

The polyimide resin composition powder obtained above was filled in a mold having an opening size of 60×10 mm and compression molded at room temperature under a pressure of 5000 kg/cm$^2$ to obtain a green product (compression molded product) of 60×10×3 mm. This compression molded product was sintered in an atmosphere of nitrogen/oxygen concentration ratio=99.5/0.5 at 440° C. for 3 hours. It was confirmed that this product did not have color shade and was a homogeneous product on appearance.

EXAMPLE 8

The polyimide resin composition powder obtained above was filled in a mold having an opening size of 60×10 mm and compression molded at room temperature under a pressure of 5000 kg/cm$^2$ to obtain a green product (compression molded product) of 60×10×3 mm. This compression molded product was sintered in an atmosphere of nitrogen/oxygen concentration ratio=99.5/0.5 at 460° C. for 15 minutes. It was confirmed that this product did not have color shade and was a homogeneous product on appearance.

EXAMPLE 9

The polyimide resin composition powder obtained above was filled in a mold having an opening size of 60×10 mm and compression molded at room temperature under a pressure of 5000 kg/cm$^2$ to obtain a green product (compression molded product) of 60×10×3 mm. This compression molded product was sintered in a nitrogen atmosphere at 420° C. for 5 hours, and then heat treated at 460° C. for 10 minutes without cooling while supplying a mixed gas of nitrogen/oxygen concentration ratio=99/1. It was confirmed that this product did not have color shade and was a homogeneous product on appearance.

EXAMPLE 10

The polyimide resin composition powder obtained above was filled in a mold having an opening size of 60×10 mm and compression molded at 2000° C. under a pressure of 3000 kg/cm² to obtain a green product (compression molded product) of 60×10×3 mm. This compression molded product was sintered in an atmosphere of nitrogen/oxygen concentration ratio=99/1 at 420° C. for 10 hours. It was confirmed that this product did not have color shade and was a homogeneous product on appearance.

EXAMPLE 11

The polyimide resin composition powder obtained above was filled in a mold having an opening size of 60×10 mm and compression molded at room temperature under a pressure of 5000 kg/cm² to obtain a green product (compression molded product) of 60×10×3 mm. This compression molded product was sintered in an atmosphere of nitrogen/oxygen concentration ratio=98/2 at 490° C. for 10 minutes. It was confirmed that this product did not have color shade and was a homogeneous product on appearance.

EXAMPLE 12

The polyimide resin composition powder obtained above was filled in a mold having an opening size of 60×10 mm and compression molded at room temperature under a pressure of 5000 kg/cm² to obtain a green product (compression molded product) of 60×10×3 mm. This compression molded product was sintered in a nitrogen atmosphere at 400° C. for 10 hours, cooled and taken out. As a result, occurrence of color shade on appearance was observed. This product was then heat treated in air at 500° C. for 1 hour. It was confirmed that color shade disappeared and this product was a homogeneous product on appearance.

COMPARATIVE EXAMPLE 1

The polyimide resin composition powder obtained above was filled in a mold having an opening size of 60×10 mm and compression molded at room temperature under a pressure of 5000 kg/cm² to obtain a green product (compression molded product) of 60×10×3 mm. This product was sintered in a nitrogen atmosphere at 420° C. for 10 hours. Occurrence of color shade on appearance was observed on this product.

COMPARATIVE EXAMPLE 2

The polyimide resin composition powder obtained above was filled in a mold having an opening size of 60×10 mm and compression molded at room temperature under a pressure of 5000 kg/cm² to obtain a green product (compression molded product) of 60×10×3 mm. This compression molded product was sintered in a nitrogen atmosphere at 350° C. for 48 hours. It was homogeneous product on appearance, but strength thereof was low.

Appearance and flexural strength of polyimide resin molding obtained in the above Examples and Comparative Examples are shown in Table 1.

TABLE 1

| Example | Color Shade on Appearance | Flexural Strength (kg/cm²) |
| --- | --- | --- |
| 1 | None | 1120 |
| 2 | None | 1180 |
| 3 | None | 1090 |
| 4 | None | 1150 |
| 5 | None | 1210 |
| 6 | None | 1150 |
| 7 | None | 1180 |
| 8 | None | 1080 |
| 9 | None | 1070 |
| 10 | None | 1250 |
| 11 | None | 930 |
| 12 | None | 910 |
| Comparative Example | | |
| 1 | Observed | 1230 |
| 2 | None | 770 |

Industrial Utilization Possibility

As described above, in the method of molding an aromatic polyimide resin in accordance with the present invention, specifically, in the method of sintering powder compacts of the aromatic polyimide resin obtained by compression molding, by adding a fluorine resin, friction resistance at molding is reduced and internal stress in the molding is relaxed to improve molding workability, density distribution of the powder compact becomes small and homogeneous, lamination and the like do not occur on appearance, and a molding having improved sliding properties can be obtained. Further, the method can easily produce and provide a polyimide resin molding having excellent quality and which does not cause deterioration of properties and color shade due to addition of the fluorine resin at low cost. The aromatic polyimide resin moldings thus obtained are widely used as mechanism parts such as sliding members, or used in the fields of automobiles, office instruments, electric and electronic instruments, aerospace, atomic energy, general industrial machines, and the like.

We claim:

1. A method of molding an aromatic polyimide resin, characterized in that in compression molding an aromatic polyimide resin composition powder comprising an aromatic polyimide resin and a fluorine resin added thereto, and then sintering, the sintering is conducted in a mixed gas atmosphere of oxygen and inert gas.

2. A method of molding an aromatic polyimide resin, characterized in that in compression molding and aromatic polyimide resin composition powder comprising an aromatic polyimide resin and a fluorine resin added thereto, and then sintering, the sintering is conducted in an inert gas atmosphere and heat treatment is then conducted in a mixed gas atmosphere of oxygen and inert gas.

3. A method of molding an aromatic polyimide resin as claimed in claim 1 or claim 2, characterized in that in the mixed gas of oxygen and inert gas, the oxygen concentration is 0.1–10%.

4. A method of molding an aromatic polyimide resin as claimed in claim 1 or claim 2, characterized in that the sintering temperature is 360° to 480° C.

5. A method of molding an aromatic polyimide resin as claimed in claim 2, characterized in that the heat treatment temperature is 360° to 480° C.

* * * * *